United States Patent
Jugel

[19]

[11] Patent Number: 5,390,174
[45] Date of Patent: Feb. 14, 1995

[54] METHOD FOR HANDLING INFORMATION CONTAINED IN A HEADER PORTION OF MESSAGE CELLS TRANSMITTED IN ASYNCHRONOUS TRANSFER MODE

[75] Inventor: Alfred Jugel, Geretsried, Germany

[73] Assignee: Siemens Aktiengesellschaft, Munich, Germany

[21] Appl. No.: 83,925

[22] Filed: Jun. 28, 1993

[30] Foreign Application Priority Data

Jun. 26, 1992 [EP] European Pat. Off. ............ 92110784

[51] Int. Cl.⁶ .......................... H04J 3/24; H04Q 11/04
[52] U.S. Cl. ........................................ 370/60; 370/94.1
[58] Field of Search .................... 370/16, 54, 60, 60.1, 370/79, 82, 94.1, 94.2, 110.1, 112

[56] References Cited

U.S. PATENT DOCUMENTS

| | | | |
|---|---|---|---|
| 4,703,475 | 10/1987 | Dretzka et al. | 370/60 |
| 5,008,878 | 4/1991 | Ahmadi et al. | 370/60 |
| 5,084,867 | 1/1992 | Tachibana et al. | 370/60 |
| 5,119,369 | 6/1992 | Tanabe et al. | 370/94.1 |
| 5,127,000 | 6/1992 | Henrion | 370/94.1 |
| 5,130,984 | 7/1992 | Cisheros | 370/94.1 |

FOREIGN PATENT DOCUMENTS 0436069 7/1991 European Pat. Off. .
0446586 9/1991 European Pat. Off. .

*Primary Examiner*—Alpus H. Hsu
*Attorney, Agent, or Firm*—Hill, Steadman & Simpson

[57] ABSTRACT

A data cell for transmission in asynchronous transfer mode through a switching network of a switching center includes a header containing routing and connection information.

This routing and connection information is converted by reducing the number of bits to a neutral connection number and a logical output number at an input peripheral side of the switching network. Multiplexing equipment converts the logical output number into one of many possible route informations for routing along different paths to the same output so that the slices of the data cell are switched along different paths in the switching network. At the output side of the switching network is a demultiplexer for restoring the cell sequence which may have been lost during switching. Output peripheral equipment returns the routing and connection information in the header portion of the data cell to the original number of bits.

1 Claim, 3 Drawing Sheets 5,390,174

METHOD FOR HANDLING INFORMATION CONTAINED IN A HEADER PORTION OF MESSAGE CELLS TRANSMITTED IN ASYNCHRONOUS TRANSFER MODE

BACKGROUND OF THE INVENTION

1. Field of the Invention

The present invention is directed generally to a method for handling a header field of message cells, or packets, transmitted in the asynchronous transfer mode (ATM) in the course of through-connection through a switching network.

2. Description of the Related Art

When handling message cells in a switching network of a an ATM (asynchronous transfer mode) switching center, a first component part VPI of the header field serves to identify a traffic route for the message cell and a second component part VCI of the header field serves to identify the connection, or output, port. These two components in the header fields of incoming ATM messages cells are converted into corresponding components in the header fields of outgoing ATM message cells. The two components VPI and VCI of the header generally span 28 bits within the header field, so that there are over 256 million possible combinations for these two components.

To avoid difficulties which would result from such a great number of possible bit combinations, a limitation on the routing and output number of possible combinations is imposed by limiting the information to 12 bits, which reduces the possible combinations to just over 4000. This limitation of the two header components is achieved through the use of an associative memory before implementation of the conversion of the first and second component parts VPI and VCI of incoming ATM message cells into corresponding component parts of outgoing ATM message cells. The conversion at the output need only be implemented using this limited number of bits.

For through-connection of packets through an ATM switching center, the header field of the ATM message cells is supplemented by additional information. The header field which is present outside the switching center is termed the external header field, while the additional portion added during switching is known as an internal header field. The internal header field includes, among other things, routing information for defining the route through the switching network, as well as a cell sequence number.

It has heretofore been true that the steps of header field combination/reduction, of conversion, of attaching an internal header field, and of subsequent restoration of an original number of bits to the header field components VPI and VCI were implemented in peripheral equipment at an input side of the switching center.

To distribute the traffic load as uniformly as possible in an ATM switching network, particularly given utilization of a flexible bandwidth allocation and to avoid overloading of individual internal routes, all routes leading from a specific switching network input to a specific switching network output are utilized for the through-connection of ATM message cells belonging to one and the same call. As a result, corresponding different routing information is inserted into the internal header portion cyclically interchanged. This method is also known as multi-pathing. As a consequence of the use of different routes, however, differences in transit time occur so that, in certain circumstances, the original cell sequence may be lost. For this reason, a restoration of the original cell sequence must be undertaken at the switching network output by using the cell number in the internal header field.

This so-called "resequencing" must be individually carried out for every connection, in other words, for every possible combination of first and second components VPI and VCI. Corresponding technical difficulties would arise if this resequencing were undertaken with the full 28 bits of the two components VPI and VCI of the external header portion. These technical difficulties are similar to those in the conversion of the possible component VPI and VCI combinations for incoming ATM message cells into corresponding combinations of outgoing ATM message cells.

SUMMARY OF THE INVENTION

An object of the present invention is to provide a method with which the aforementioned technical difficulties may be avoided.

This and other objects and advantages of the invention are achieved by a method for handling information contained in the header field of message cells which are transmitted via an asynchronous transfer mode (ATM) through a switching network of a switching center, the through connection of the message cells being accomplished by logical connections along different paths through the switching network of the switching center and then restoring at the output side the original data sequence which may have been lost during transmission, the method including the steps of: converting the first and second component parts of the header field of the message cells into a neutral output related connection number and a logical switching output number by restricting the number of bits, the conversion being carried out by equipment at the peripheral input side of the switching center, wherein the first and second components serve to identify the traffic route and the connection, respectively; converting every logical switching network output number into one of a plurality of routing information that identifies different paths leading to a same switching network output, the conversion being performed by equipment at the input side of the switching network; and restoring the cell sequence of the message cells which are identified by a same neutral connection number using the output related connection number, the restoration being performed by equipment at the peripheral output side of the switching network.

In accordance with the principles of the present invention, the procedures for reducing the number of first component VPI and second component VCI combinations, for converting the components VPI and VCI combinations of incoming of ATM message cells into the first component VPI and the second component VCI combinations of outgoing ATM message cells, for restoration of the original number of the first component VPI and component part VCI combination possibilities, and for forming the cyclically modified routing information of the internal cell header and restoring of the potentially lost cell sequence are distributed between equipment at the peripheral input side and the peripheral output side of the ATM switching center in a specific way.

BRIEF DESCRIPTION OF THE DRAWINGS

The invention shall be set forth in greater detail hereinbelow in an exemplary embodiment with reference to the drawings.

DETAILED DESCRIPTION OF THE PREFERRED EMBODIMENTS

Figure 1:
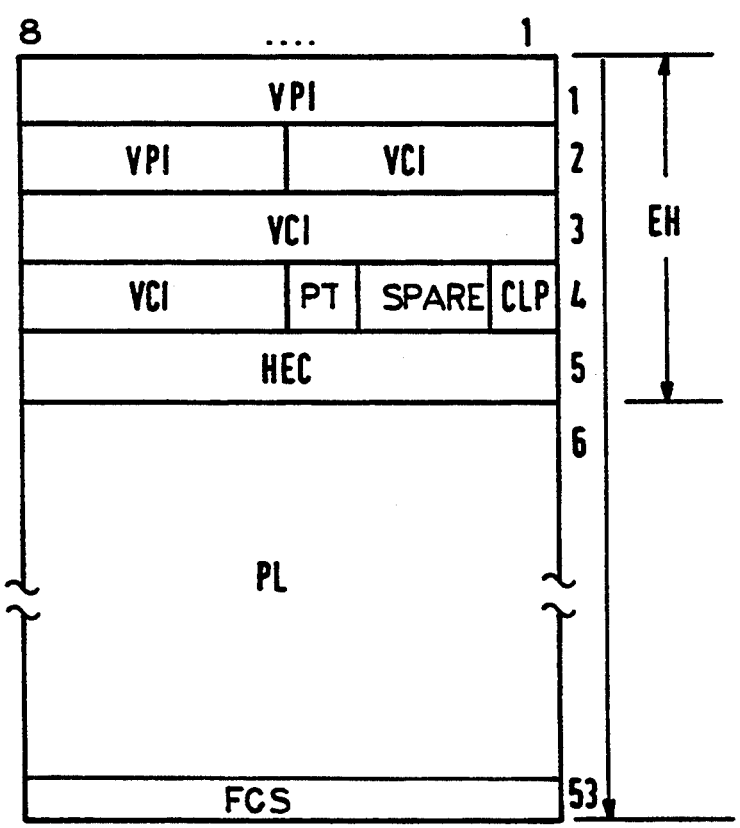
FIG. 1 is a diagram showing the format of an external ATM message cell, or packet.

In FIG. 1, a schematic diagram shows an external ATM (asynchronous transfer mode) message cell, or packet, composed of a total of 53 bytes, each byte being eight bits in width and referred to as an octet. Of course, other packet lengths are possible. The data cell, or packet is made-up of different functional portions, the first portion of the packet being referred to as the external header portion EH (external header) of the data cell and occupying five bytes or octets. The first three and one half bytes of the external header are made up of first and second distribution identifying components VPI and VCI, which encompass a total of 28 bits. The first component VPI identifies the traffic route for the data cell and the second component VCI identifies the output connection. The external header portion EH also includes a payload type component part PT which is four bits in length and which indicates the type of information found in a following useful part PL of the data cell. The remaining portion of the external header EH includes two unused bits labelled SPARE, a part CLP which is two bits wide and which indicates a priority that is used in case of cell loss, and a single byte or octet termed header error control HEC that represents a code control word for the external cell header EH.

As mentioned above, the useful portion PL of the external ATM data cell follows the header and is 48 bytes, or octets, in length in the illustrated example. The useful portion PL is the data that is being transferred between two locations through the switching network. The useful part PL is followed by a one byte length portion termed a frame check sequence FCS which identifies the end of the data packet, or cell.

Figure 2:
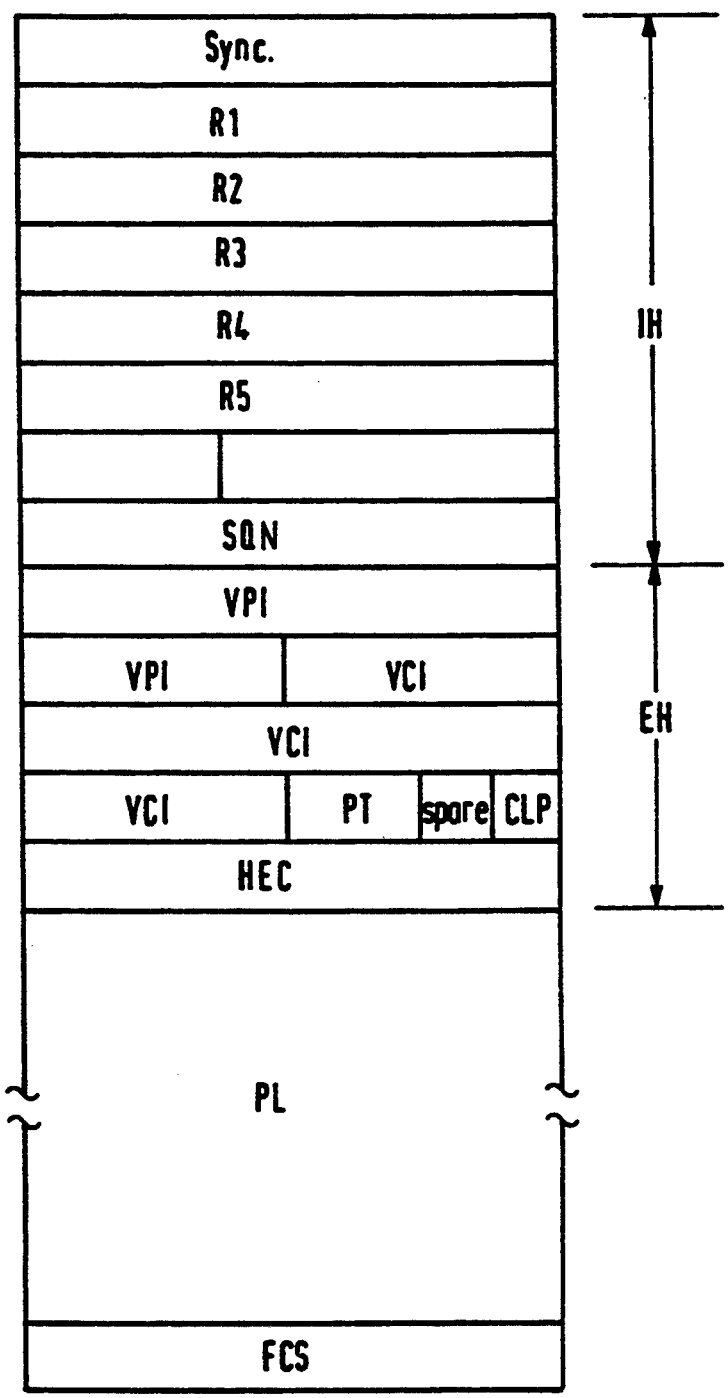
FIG. 2 is a diagram showing the format of an internal ATM message cell.

While FIG. 1 shows the data cell structure for a data packet when it is outside or external to a switching network, FIG. 2 shows the structure of an internal ATM data cell which is the form assumed by the data packet of FIG. 1 as it is being switched through a switching network. The header portion of the data cell is expanded by the addition of an internal cell header IH preceding the external header EH. The internal header IH is eight bytes in length, the eight bytes being made up of: a single byte, or octet, termed a synchronization byte Sync, a series of five bytes of routing information R1, R2, R3, R4, and R5 that determine the route of the data cell through the switching network, and a single byte length sequence number SQN.

Figure 3:
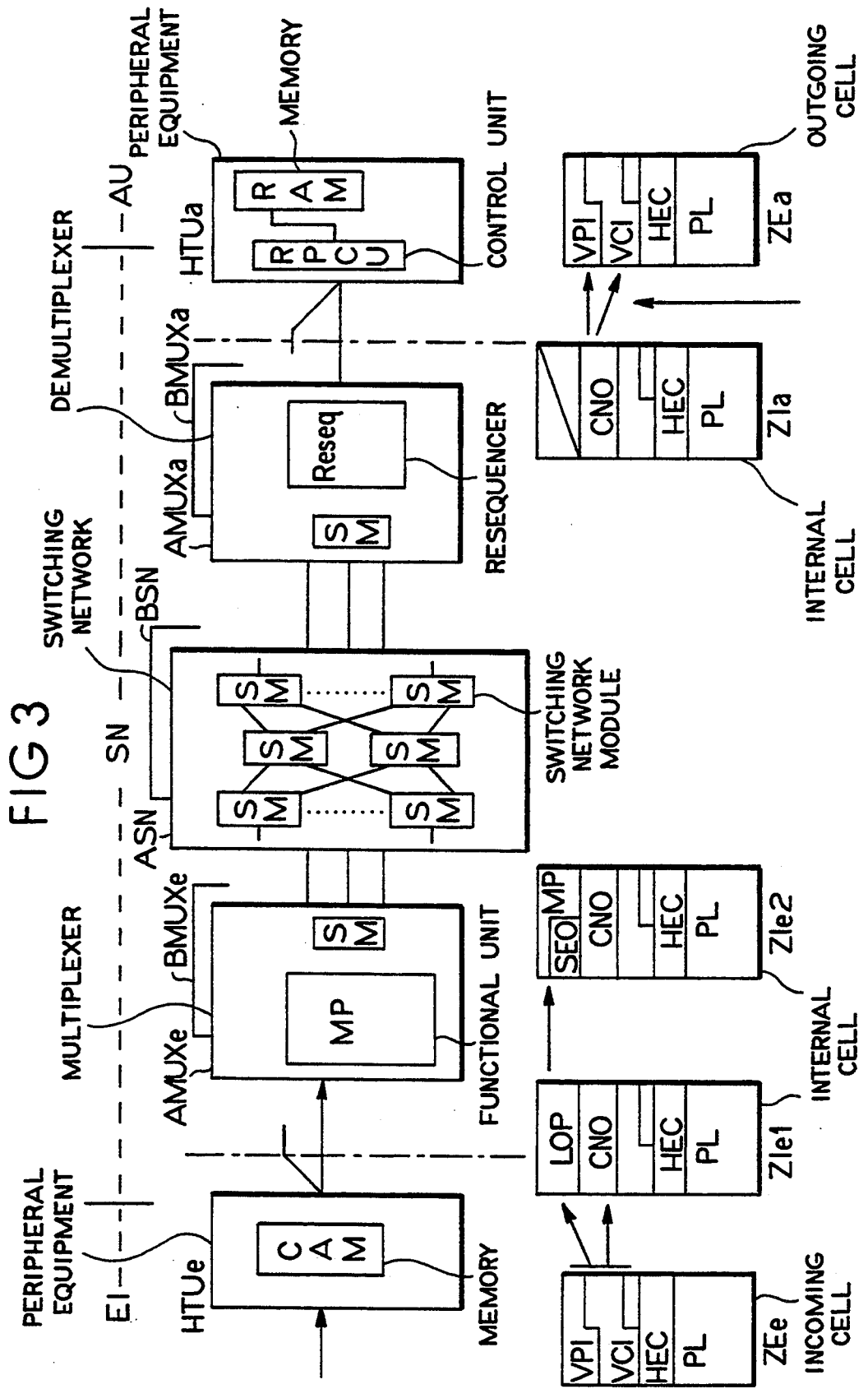
FIG. 3 is a schematic block diagram showing the structure of an ATM switching center together with peripheral equipment for carrying out the method of the present invention and showing formats of message cells at various stages in the equipment.

Referring now to FIG. 3, a block circuit diagram of equipment for switching the data cells through a switching network is shown. An input peripheral portion EI precedes a switching network SN, which is in turn followed by output peripheral equipment AU, as labeled across the top of FIG. 3. At the input periphery is provided peripheral equipment HTUe which includes a module CAM. The input peripheral equipment HTUe feeds the data cells tca pair of multiplexers AMUXe and BMUXe at the input side of the switching network, the pair of multiplexers actually being redundant multiplexers AMUXe and BMUXe which each are connected to receive the data cells from the input peripheral equipment HTUe. Each of the multiplexers AMUXe and BMUXe includes a functional unit MP and a switching module SM. The actual switching network is composed of two redundant switching network levels ASN and BSN which having respective, multi-stage arrangements of switching network modules SM. The output of the switching network levels ASM and BSM is fed to redundant demultiplexes AMUXa and BMUXa at the output side of the switching network portion. The redundant demultiplexes AMUXa and BMUXa each include a switching module SM and a resequencing part RESEQ, and each feed data cells, or packets, to output peripheral equipment HTUa. The output peripheral equipment HTUa includes a resequencing process control unit RPCU and a random access memory RAM.

The operation of the switching method according to the present invention will be described in conjunction with the block elements of FIG. 3 and the data cell structures shown therebelow. An incoming ATM data cell ZEe shown on the lower left of FIG. 3 is input to the input peripheral equipment HTUe at the input side of the illustrated switching apparatus. The input peripheral equipment HTUe limits the possible combinations of the first and second header components VPI and VCI of the incoming data cell and interprets the component parts VPI/VCI combinations. Whereas the component part VPI/VCI combinations have hitherto been immediately generated at the input peripheral equipment by conversion in a form in which they are further transmitted as a component part of an external ATM data cell after a through-connection through the switching network, according to the present method only conversion of the component VPI/VCI combinations of incoming external ATM data cells into an output-related connection number CNO and into a logical switching network output number, or logical output port number, LOP is initially undertaken by the input peripheral equipment HTUe. This conversion results in the formation of an internal cell format ZIe1 which differs from the format of the internal cell shown in FIG. 2 by not containing differentiated routing information for the routing through the switching network. The total number of bytes for the internal cell ZIe1 is the same as the number of bytes in the internal ATM data cell shown in FIG. 2 for compatibility reasons. Like the external component VPI/VCI combinations, the output-related connection number CNO unambiguously identifies a specific connection and only comprises, for example, 12 bits of data in comparison to the 28 bits required for the component VPI/VCI combinations. This 12 bit output related connection number CNO, however, adequately distinguishes all connections to be through-connected to any particular switching network output.

The redundant input multiplexers AMUXe and BMUXe at the input side of the switching network SN convert the logical switching network output number LOP into routing information. In other words, the logical output port number LOP identifies the physical path through the switching network to be taken by the data cell. The input multiplexers AMUXe of the preferred embodiment are ATM multiplexers. To distribute the traffic flow uniformly through the switching network, the routing information R1–R5 is alternated in cyclical fashion to all possible paths between a specific input and a specific output. This routing information conversion is effected in the input multiplexers AMUXe and BMUXe by the functional units MP. In the data cell diagram can be seen the appertaining component MP in the internal header portion of the internal ATM data cells EIe2. Also in the internal header portion of the data cells EIe2 is found a sequence number SEQ. The ATM data cells are switched through the switching network ASN and BSN in this form.

The output connection number CNO has approximately 4,000 different values based on its 12 bit length. The through-connection of the internal ATM data cells is accomplished by separation into switching network slices. The switching through of the data slices is accomplished by evaluation of the output related connection number CNO and of the appertaining sequence number SEQ. The data slices reach the redundant output side demultiplexes AMUXa and BMUXa where the resequencer part RESEQ restores the potentially lost cell sequence of the ATM data cell for the appertaining neutral output related connection number CNO. Once the resequencing of the data slices has been accomplished to achieve the correct data sequence, the part MP with the sequencing number SEQ of the internal cell header is eliminated from the ATM data cell as shown at ZIA.

Using the output related connection number CNO in the header portion of the ATM data cell which has the format shown in diagram ZIA and using the cell number, cell sequences which belong together and were conducted over the two switching network slices are reunited on a line at the output peripheral equipment HTUa at the output periphery side. The output related connection number CNO is then converted into a component VPI/VCI combination in the external header EH of the outgoing ATM data cell, as shown in diagram ZEa, so that the data format once again corresponds to that shown in FIG. 1.

The so-called resequencing according to the method of the present invention is implemented on the basis of the restriction of the number of output combinations.

The separation of the connected related data which is held in the periphery and the data relating to the physical structure of the switching network that are exclusively handled there is guaranteed.

Since the data passes through the various functional units including the input peripheral equipment HTUe, the output peripheral equipment HTUa, the switching network modules SM, the redundant multiplexers AMUXe and BMUX3 and redundant demultiplexes AMUXa and BMUXa, the parts of the internal and external header regions are multiply differently occupied so that the header part and useful part relation existing during the course of the through-connection is beneficial and, thus, the switching network is efficiently utilized.

In data cell switching through an ATM switching network, the data cells are preceded by headers which include component parts that identify the traffic route and the connection. The number of bits used in these component parts is reduced and then converted to a neutral connection number and a logical output number at an input periphery of the switching network. A multiplexer converts the output logical number into a plurality of routing information along different paths in the switching network to the same output. Once switched through the switching network, the data cell sequence is restored and the neutral connection number is returned to its original number of bits at the output peripheral side. Efficiency by uniformly distributing traffic load through the switching network is thus achieved.

Although other modifications and changes may be suggested by those skilled in the art, it is the intention of the inventors to embody within the patent warranted hereon all changes and modifications as reasonably and properly come within the scope of their contribution to the art.

I claim:

1. A method for handling information in a header of a message cell that is transmitted in asynchronous transfer mode during routing of the message cell through a switching network of a switching center, comprising the steps of:
   a) converting external component parts of a message cell header that identify traffic routes through a switching network and identify an output connection of the switching network into a neutral output-related connection number and a logical switching network output number that have a reduced number of bits relative to said external component parts, said step a) being performed by equipment at an input peripheral side of the switching center;
   b) converting said logical switching network output number into one of a plurality of routing information that identifies a first path leading to a same switching network output, said step b) being performed by equipment at an input side of said switching network;
   c) converting a logical switching network output number of a subsequent message cell into one of a plurality of routing information that identifies a second path leading to said switching network output, said step c) being performed by equipment at said input side of said switching network; and
   d) restoring an original cell sequence of message cells that are identified by a same one of said neutral output-related connection number by using said neutral output-related connection number, said step d) being performed by equipment at an output side of said switching network.

* * * * *